Dec. 30, 1930.  H. T. NELSON  1,786,576

HELICOPTER

Filed Jan. 25, 1930  2 Sheets-Sheet 1

INVENTOR.
Harry T. Nelson
BY

ATTORNEYS.

Dec. 30, 1930.    H. T. NELSON    1,786,576
HELICOPTER
Filed Jan. 25, 1930    2 Sheets-Sheet 2

INVENTOR.
BY  Harry T. Nelson
ATTORNEYS.

Patented Dec. 30, 1930

1,786,576

UNITED STATES PATENT OFFICE

HARRY TRACY NELSON, OF DALLAS, TEXAS

HELICOPTER

Application filed January 25, 1930. Serial No. 423,394.

The invention relates to new and useful improvements in helicopters.

The object of the invention is to provide a practical helicopter for both vertical and horizontal flight.

Another object of the invention is to provide a helicopter with inherent stability, maximum safety and ease of control.

A further object of the invention is to provide a helicopter of simple construction, without the usual complication of drives and gears so common in aircraft of this type.

An important object of the invention is to provide a helicopter with a large horizontal propeller above the center of the frame, rotated by means of another horizontal propeller fixed to the same axis and extending into the slipstream of the horizontal lifting propellers on each side of the frame.

Figure 1:
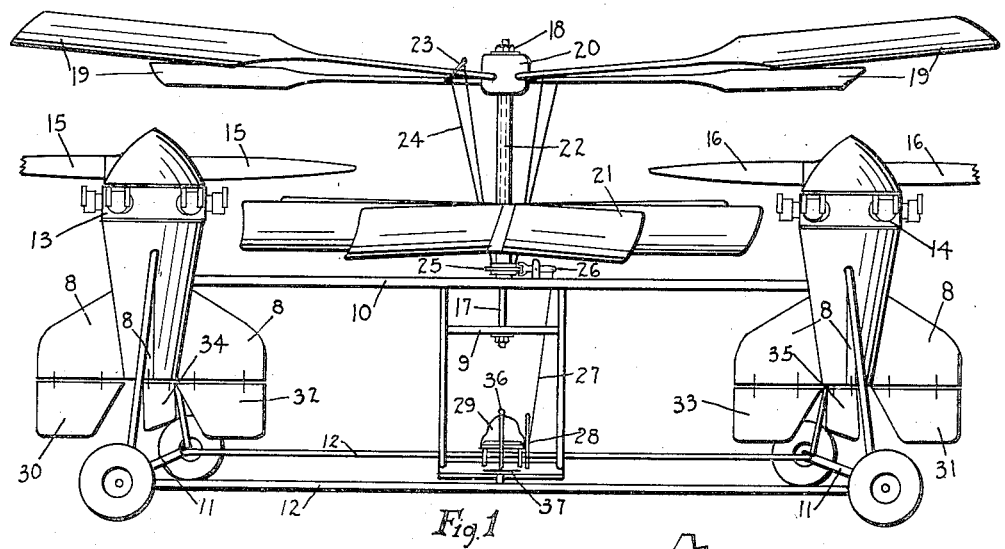
Figure 2:
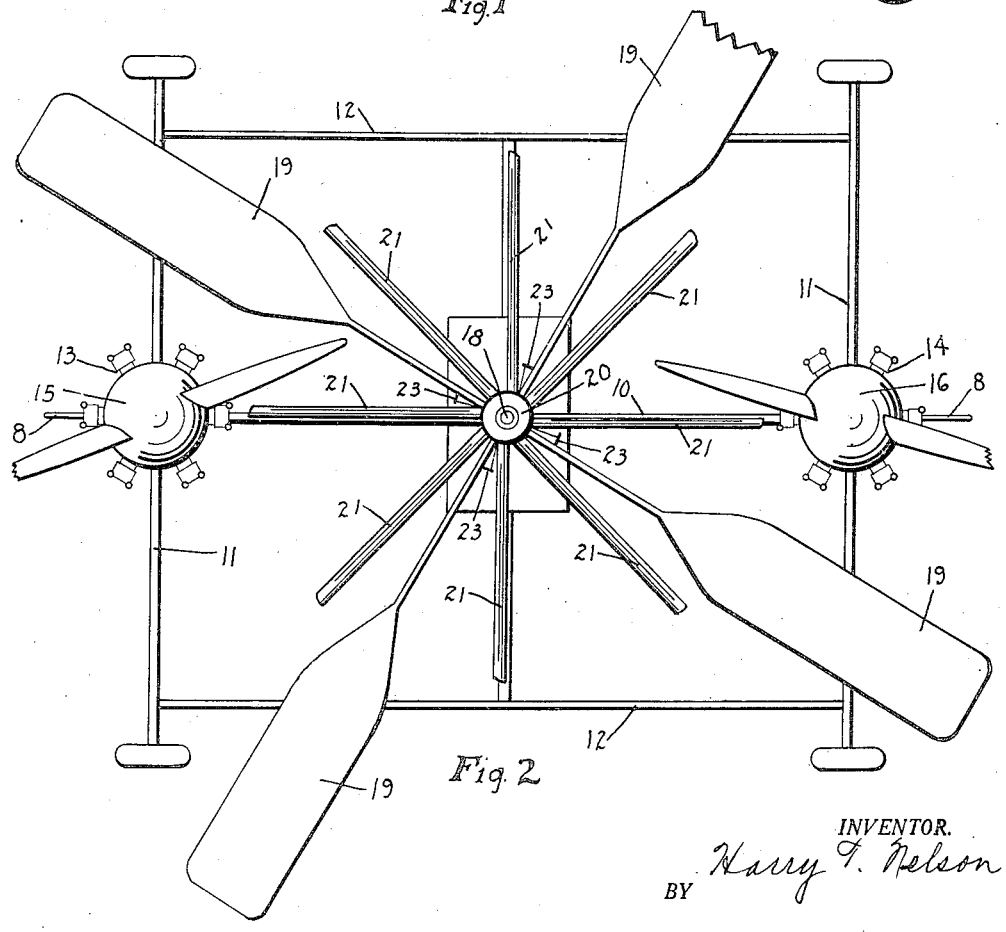
Figure 3:
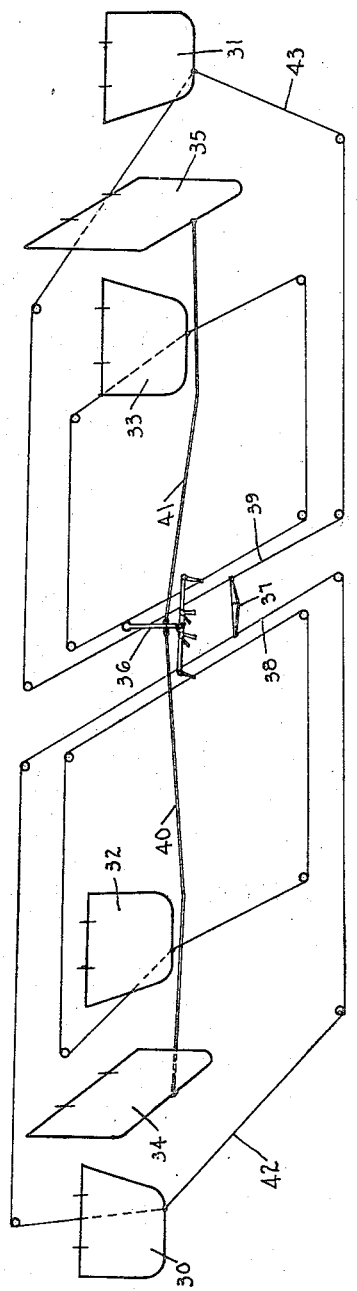

One form of the invention is illustrated in the accompanying drawings in which Fig. 1 is a side elevation of the machine and Fig. 2 is a vertical view. Fig. 3 shows the system of control.

The frame of the helicopter is preferably made of light steel tubing and is equipped with air-cooled motors, 13 and 14 placed on opposite sides of the frame in a position so that the propellers 15 and 16 will rotate horizontally. These are the primary lifting propellers. Greater lifting power could be had by having motors on all four sides.

The cowlings of these motors are streamlined and stabilizing fins 8 are placed on four sides of the cowling in the slipstream of the propellers 15 and 16. Controls, 30, 31, 32, 33, 34 and 35 are hinged to the fins, which will subsequently be explained in greater detail.

The vertical axis, 17 is fixed rigidly to tubes 9 and 10 and extends up to nut 18. Propellers 19 and 21 are rigidly connected to tube 22, thereby being free to rotate together horizontally on journal 17. These are preferably fitted with ball bearings.

Propeller 21 passes directly into the slipstream of propellers 15 and 16, so that when it is rotated by the downward current of air, propeller 19 is also rotated with it.

The propeller 21 has its blades set with the angle of incidence at about 15 degrees in order to have the most efficient lift-drift ratio. This propeller may also be arranged with variable pitch.

Propeller 19 serves to assist in lift and to stabilize the machine vertically. It may also be used as a parachute in the descent of the helicopter. It is equipped with variable pitch blades. There are a number of well known means for varying the pitch of propellers. The form shown is actuated by a lever 28 at the side of the pilot. Rod 27 moves arm 26 which actuates sliding collar, 25. This collar turns with propellers 19 and 21 but is free to slide up or down. Connecting members as 24 are attached to collar 25 and arm 23, moving axially the blades of propeller 19, thus varying their pitch from a positive to a negative angle. Other forms may be used.

Thus the pilot can set the pitch of propeller 19 in a neutral position, speed up motors 13 and 14, thereby gradually building up a rapid rotation of propeller 19 and then change it to a positive pitch, taking off vertically. In this manner it is similar to the ground run of an airplane building up momentum for the take-off.

In the event of engine failure, the helicopter may be brought slowly and safely to the ground by reversing the pitch of propeller 19. The fact that it is rotating at all times keeps it ready for this purpose.

The controls provided as shown in Fig. 3 are relatively small, but are very effective for the reason that the movable surfaces are placed directly under the lifting propellers, 15 and 16. Stick control is used and reference to Fig. 3 will show that the movable surfaces are so coordinated as to give complete control of the helicopter on all of its axes. Bar 37 is connected by wire cables 42 and 43 to ailerons 30 and 31. These keep the machine from turning on the vertical axis.

The movable flaps 34 and 35 are actuated by small rods 40 and 41 connected directly between the stick and the flap and control the lateral moments of the helicopter with reference to the pilot.

Movable surfaces, 32 and 33 are actuated by the stick and wire cables, 38 and 39, using guide pulleys, of course, as with 30 and 31.

This arrangement gives the pilot a control of the machine so that the movements of the stick and bar follow the natural tendency to make corrections of position as with the ordinary airplane. For instance, if the helicopter was tilting too much to the pilot's left, a movement of the stick to the right would make the correction of position.

It will also be seen that these controls may be used to great advantage in descending and to taxi the helicopter.

I am aware that prior to my invention helicopters have been made with variable pitch propellers and controlling devices, and therefore do not claim such a combination broadly; but

I claim:

1. In a helicopter, the combination of a frame, motors with horizontal propellers mounted on opposite sides of the frame, a large horizontal propeller mounted on a vertical axis above the center of the frame, the lower hub of which is extended downward with a smaller propeller fixed near the lower end of the hub, said propeller being free to rotate horizontally with the large propeller, means for controlling the direction of the machine and means for varying the pitch of the large propeller.

2. In a helicopter, the combination of a frame, motors with horizontal propellers mounted on opposite sides of the frame, a large horizontal propeller mounted on a vertical shaft above the center of the frame, the lower hub of which is extended downward, a smaller horizontal propeller fixed to the hub near the lower end, said lower propeller having its blades extended into the slipstream of the lifting propellers on opposite sides of the frame and means for controlling the direction of the machine.

3. In a helicopter, the combination of a frame, motors with horizontal propellers mounted on opposite sides of the frame a large horizontal propeller mounted on a vertical shaft above the center of the frame, the lower hub of which is extended downward, a smaller horizontal propeller fixed to the hub near the lower end, said lower propeller having its blades extended into the slipstream of the lifting propellers on opposite sides of the frame and means for controlling the direction of the machine, means for varying the pitch of the large propeller.

HARRY TRACY NELSON.